(12) United States Patent
Zaugg

(10) Patent No.: US 7,304,314 B2
(45) Date of Patent: Dec. 4, 2007

(54) QUANTUM CROSS-AMBIGUITY FUNCTION GENERATOR

(75) Inventor: Thomas C. Zaugg, Ypsilanti, MI (US)

(73) Assignee: General Dynamics Advanced Information Systems Inc., Fairfax, VA (US)

( * ) Notice: Subject to any disclaimer, the term of this patent is extended or adjusted under 35 U.S.C. 154(b) by 195 days.

(21) Appl. No.: 10/996,462

(22) Filed: Nov. 26, 2004

(65) Prior Publication Data

US 2005/0151093 A1    Jul. 14, 2005

Related U.S. Application Data

(60) Provisional application No. 60/524,896, filed on Nov. 26, 2003.

(51) Int. Cl.
*G01J 9/00* (2006.01)

(52) U.S. Cl. .................... 250/458.1; 342/195

(58) Field of Classification Search ............. 250/458.1; 342/195

See application file for complete search history.

(56) References Cited

U.S. PATENT DOCUMENTS

| | | | |
|---|---|---|---|
| 4,225,938 A | 9/1980 | Turpin | |
| 4,286,328 A | 8/1981 | Bocker | |
| 4,468,093 A * | 8/1984 | Brown | ........................ 359/310 |
| 4,633,427 A | 12/1986 | Bocker | |
| 5,339,182 A | 8/1994 | Kimble et al. | |
| 5,389,790 A * | 2/1995 | Honey et al. | ................ 250/342 |
| 5,420,905 A | 5/1995 | Bertozzi | |
| 5,796,477 A * | 8/1998 | Teich et al. | .................. 356/318 |
| 5,917,322 A | 6/1999 | Gershenfeld et al. | |
| 6,057,541 A | 5/2000 | Steenblik | |
| 6,252,665 B1 | 6/2001 | Williams et al. | |
| 6,289,104 B1 | 9/2001 | Patterson et al. | |
| 6,314,189 B1 | 11/2001 | Motoyoshi et al. | |
| 6,424,665 B1 | 7/2002 | Kwiat et al. | |
| 6,430,345 B1 | 8/2002 | Dultz et al. | |
| 6,444,999 B1 | 9/2002 | Tomita | |
| 6,473,719 B1 | 10/2002 | Steenblik | |
| 6,480,283 B1 | 11/2002 | Williams et al. | |
| 6,522,749 B2 | 2/2003 | Wang | |
| 6,567,164 B2 * | 5/2003 | Birk et al. | .................. 356/317 |
| 6,646,727 B2 | 11/2003 | Saleh et al. | |
| 6,678,054 B1 | 1/2004 | Dress et al. | |

(Continued)

FOREIGN PATENT DOCUMENTS

EP    1091240    4/2001

(Continued)

OTHER PUBLICATIONS

Enzer et al., Entangled-photon six-state quantum cryptography, New Journal of Physics 4 (2002) 45.1-45.8.

(Continued)

*Primary Examiner*—David Porta
*Assistant Examiner*—Shun Lee
(74) *Attorney, Agent, or Firm*—Hunton & Williams LLP

(57) ABSTRACT

A cross-ambiguity function generator ("CAF") uses properties of quantum mechanics for computation purposes. The CAF has advantages over standard analog or digital CAF function generators, such as improved bandwidth. The CAF may be used for traditional geolocation or RADAR applications.

76 Claims, 5 Drawing Sheets

U.S. PATENT DOCUMENTS

| | | | |
|---|---|---|---|
| 2001/0053608 A1* | 12/2001 | Williams et al. ............ | 438/706 |
| 2002/0018290 A1 | 2/2002 | Birk et al. | |
| 2002/0020819 A1 | 2/2002 | Wolleschensky et al. | |
| 2002/0030623 A1* | 3/2002 | Arikan et al. ............... | 342/195 |
| 2002/0036775 A1 | 3/2002 | Wolleschensky et al. | |
| 2002/0093632 A1 | 7/2002 | Teich et al. | |
| 2002/0109840 A1 | 8/2002 | Wolleschensky et al. | |
| 2002/0140941 A1 | 10/2002 | Pedigo | |
| 2002/0198650 A1* | 12/2002 | Baugh et al. ............... | 701/207 |
| 2003/0002670 A1 | 1/2003 | Wang | |
| 2003/0086138 A1 | 5/2003 | Pittman et al. | |
| 2003/0117319 A1* | 6/2003 | Rideout et al. ............. | 342/453 |
| 2004/0036877 A1 | 2/2004 | Sergienko et al. | |
| 2004/0208638 A1 | 10/2004 | Jansen | |

FOREIGN PATENT DOCUMENTS

| | | |
|---|---|---|
| WO | WO 02/454468 A2 | 6/2002 |
| WO | WO 03/019282 A2 | 3/2003 |
| WO | WO 03/019283 A2 | 3/2003 |
| WO | WO 03/019284 A2 | 3/2003 |

OTHER PUBLICATIONS

Bouwmeester et al., Experimental quantum teleportation, Nature, vol. 390, Dec. 11, 1997, pp. 575-579.

Sciarrino et al., Delayed-choice entanglement swapping with vacuum-one-photon quantum states, Physical Review A, 66, 024309 (2002).

Altepeter et al., Ancilla-assisted quantum process tomography, Physical Review Letters, vol. 90, No. 19, May 16, 2003, 193601- to 193601-4.

Giacomini et al., Active teleportation of a quantum bit, Physical Review A, 66, 030302(R) (2000).

Jost et al., Spatial correlations of spontaneously down-converted photon pairs detected with a single-photon-sensitive CCD camera, Optics Express 81, Jul. 20, 1998, vol. 3, No. 2.

Ribeiro et al., Image and coherence transfer in the stimulated down-conversion process, Physical Review A, vol. 60, No. 6, Dec. 1999, 5074-5078.

Monken et al., Transfer of angular spectrum and image formation in spontaneous parametric down-conversion, Physical Review A, vol. 57, No. 4, Apr. 1998, 3123-3126.

Ribeiro et al., Observation of image transfer and phase conjugation in stimulated down-conversion, Physical Review Letters, vol. 87, No. 13, Sep. 24, 2001, 133602-1 to 133602-4.

Fonseca et al., Quantum interference by a nonlocal double slit, Physical Review A, vol. 60, No. 2, Aug. 1999, 1530-1533.

Atature et al., Entanglement in cascaded-crsytal parametric down-conversion, Physical Review Letters, vol. 86, No. 18, Apr. 30, 2001, 4013-4016.

White et al., Nonmaximally entangled states: production, characterization, and utilization, Physical Review Letters, vol. 83, No. 16, Oct. 18, 1999, 3103-3107.

Kwiat et al., Ultrabright source of polarization-entangled photons, Physical Review A, vol. 60, No. 2, Aug. 1999, 773-776.

Kwiat et al., Experimental entanglement distillation and "hidden" non-locality, Letter to Nature, 1014-1017, 2001.

Grover, Quantum computers can search arbitrarily large databases by a single query, Physical Review Letters vol. 79, No. 23, Dec. 8, 1997, 4709-4712.

Ekert et al., Quantum computation and Shor's factoring algorithm, Reviews of Modern Physics, vol. 68, No. 3, Jul. 1996, 733-753.

Blum, Density matrix theory and applications, 1-217, 1981.

Ekert, Quantum cryptography based on Bell's theorem, Physical Review Letters, vol. 67, No. 6, Aug. 5, 1991, 661-663.

Scully et al., Two-photon scheme for detecting the Bell basis using atomic coherence, Physical Review Letters, vol. 83, No. 21, Nov. 22, 1999, 4433-4436.

Saleh et al., Entangled-photon virtual-state spectroscopy, Physical Review Letters, vol. 80, No. 16, Apr. 20, 1998, 3483-3486.

Oberparleiter et al., Optics Communications, 183 (2000) 133-137.

Georgiades et al., Nonclassical excitation for atoms in a squeezed vacuum, Physical Review Letters, vol. 75, No. 19, Nov. 6, 1995, 3426-3429.

Joobeur et al., Spatiotemporal coherence properties of entangled light beams generated by parametric down-conversion, Physical Review A, vol. 50, No. 4, Oct. 1994, 3349-3361.

Abouraddy et al., Role of entanglement in two-photon imaging, Physical Review Letters, vol. 87, No. 12, Sep. 17, 2001, 123602-1 to 123602-4.

Abouraddy et al., Double-slit interference of biphotons generated in spontaneous parametric downconversion from a thick crystal, Journal of Optics B: Quantum and Semiclassical Optics 3, 2001, S50-S54.

Kwiat et al., Experimental verification of decoherence-free subspaces, Science, vol. 290, Oct. 20, 2000, 498-500.

Naik et al., Entangled state quantum cryptography: eavesdropping on the Eckert protocol, Physical Review Letters, vol. 84, No. 20, May 15, 2000, 4733-4736.

Perina et al., Multiphoton absorption cross section and virtual-state spectroscopy for the entangled $n$-photon state, Physical Review A, vol. 57, No. 5, May 1998, pp. 3972-3986.

Fei et al., Entangled-induced two-photon transparency, Physical Review Letters, vol. 78, No. 9, Mar. 3, 1997, pp. 1679-1682.

Jost et al., Spatial correlations of spontaneously down-converted photon pairs detected with a single-photon-sensitive CCD camera, Optics Express, Jul. 20, 1998, vol. 3, No. 2, pp. 81-88.

Rubin et al., Theory two-photon entanglement in type-II optical parametric down-conversion, Physical Review A, vol. 50, No. 6, Dec. 1994, pp. 5122-5133.

Rarity et al., Experimental demonstration of single photon rangefinding using parametric downconversion, Applied Optics, vol. 29, No. 19, Jul. 1, 1990, pp. 2939-2943.

Waks et al., Security of quantum key distribution with entangled photons against individual attacks, Physical Review A, vol. 65, 052310-1 to 052310-16, 2002.

* cited by examiner

QUANTUM CROSS-AMBIGUITY FUNCTION GENERATOR

RELATED APPLICATIONS

The present application is related to U.S. Utility patent application Ser. No. 10/850,394 entitled "System and Method of Detecting Entangled Photons" to Kastella et al., which claims priority to U.S. Provisional Application Ser. No. 60/472,731 entitled "System and Method of Detecting Entangled Photons" to Kastella et al., the disclosures of which are expressly incorporated by reference herein in their entirety.

FIELD OF THE INVENTION

The present invention relates to systems for and methods of calculating the cross-ambiguity function ("CAF") using quantum mechanical properties.

BACKGROUND OF THE INVENTION

The (narrow-band) CAF is generally given as $$CAF(\tau, \delta) = \int_0^T s_1(t) s_2^*(t-\tau) e^{-i\delta*(t-\tau)} dt,$$

where $s_1$ and $s_2$ each represent a signal reading, each of which may arise from a single emitted signal or be a composite of several component signals possibly originating from different signal emitters. The signal readings $s_1$ and $s_2$ may be radio frequency ("RF") or downconverted intermediate frequency ("IF"). In the above equation, the symbol $\tau$ is a time parameter, $\delta$ is a frequency parameter, the star symbol ("*") represents the complex conjugate, and T represents the time interval over which the measurements are taken. The symbols $\tau$ and $\delta$ are used in the above equation to represent time and frequency shift, respectively, between component signals of $s_1$ and $s_2$ that originate from a common emitter. The parameter $\tau$ in the above equation is related to time difference on arrival ("TDOA") and to receiver-dependant delays. The parameter $\delta$ in the above equation is related to frequency difference on arrival ("FDOA") and to downconversion shifts.

The representation of the CAF given above is for illustrative purposes and is not meant to be limiting. The CAF may take other forms, representations, or variants. By way of non-limiting example, one such form is a CAF that employs an additional term (e.g., $\beta$) for frequency-dependent Doppler shift. Such a form is particularly suited for broadband signals. Nevertheless, because such forms, representations, and variants are used to derive essentially the same information, the article "the" is used when referring to "CAF." That is, any function that derives essentially the same information from essentially the same inputs is referred to herein as "the CAF."

The two dimensions $\tau$ and $\delta$ in the above equation define a plane, which is referred to as "the CAF plane." Other representations of the CAF plane that do not use these specific symbols are also possible. The values of the CAF for specific values of $\tau$ and $\delta$ defines a surface over the plane, and peaks on this surface represent a signal source. By scanning the CAF plane, values of $\tau$ and $\delta$ for one or more signal emitters may be determined. The actual locations of the signal source(s) may be derived from this information.

Thus, the CAF is used in RADAR processing and geolocation techniques. Using the above terminology, in RADAR a signal is transmitted, $s_1$ is received and $s_2$ is a copy of the transmitted signal. The received signal $s_1$ includes signal components reflected from different objects, each of which will arrive at a different delay and different Doppler (frequency shift), which information is used to determine the range and (at least a component of the) speed of each object relative to the RADAR transmitter.

The CAF is typically very computationally intensive to calculate, especially for broadband signals where a scale factor instead of, or in addition to, a frequency-shift term is used. Accordingly, standard analog or digital systems are relatively slow and expensive except for the narrowband case. Acousto-optical techniques have been proposed, but suffer from limited dynamic range and a very small TDOA search range. These and other drawbacks exist with current systems.

Two photons quantum mechanically entangled together are referred to as an entangled-photon pair (also, "biphotons"). Traditionally, the two photons comprising an entangled-photon pair are called "signal" and "idler" photons. The designations "signal" and "idler" are arbitrary and may be used interchangeably. The photons in an entangled photon pair have a connection between their respective properties. Measuring properties of one photon of an entangled-photon pair determines properties of the other photon, even if the two photons are separated by a distance. As understood by those of ordinary skill in the art and by way of non-limiting example, the quantum mechanical state of an entangled-photon pair cannot be factored into a tensor product of two individual quantum states.

SUMMARY OF THE INVENTION

According to an embodiment of the present invention, a system for and method of calculating a cross-ambiguity function is provided. Electromagnetic signals are received. Entangled photons are generated. The entangled photons are modulated with information relating to the received electromagnetic signals to produce modulated photons. The modulated photons are detected, and detection information derived from the detecting is used to produce a cross ambiguity function value relating to the electromagnetic signals.

Various additional features of the above embodiment include the following. The cross ambiguity function value may correspond to a difference between two time values, a detuning between a pump laser frequency and a cavity resonance frequency, and a ratio of two scale parameters. The detecting may use a biphoton sensitive material. The detection information may comprise data representing indicia of biphoton absorption at a location along a magnetic field gradient. The detecting may be by way of detecting at least one of fluorescence, phosphorescence, direct electron transfer, and ionization. The detecting may use an electronic coincidence counter. The detection information may include a number of biphoton detection events detected during a specified time period. The cross ambiguity function value may be related to a time offset and a frequency offset. A second cross ambiguity function value related to a second time offset and a second frequency offset may be determined. A bandwidth of the electromagnetic signals may be on the order of, or exceed, one gigahertz. The modulating may include rotating polarizations of the entangled photons in proportion to the information relating to the received electromagnetic signals.

According to another embodiment of the present invention, a system for and method of calculating a cross-ambiguity function is presented. A first electromagnetic signal is received at a first location. A second electromagnetic signal is received at a second location. A pump laser produces pump laser photons. Entangled photons comprising signal photons and idler photons are generated from the pump laser photons. Either the signal photons or the idler photons are modulated with first information relating to the first electromagnetic signal to produce first modulated photons, and the other of the signal photons or the idler photons are modulated with second information relating to the second electromagnetic signal to produce second modulated photons. The first modulated photons and the second modulated photons are directed to an optical cavity. The first modulated photons and the second modulated photons are detected. Information derived from the detection is used to produce a cross ambiguity function value for the first electromagnetic signals and the second electromagnetic signals.

Various additional features of the above embodiment include the following. The cross ambiguity function value may correspond to a difference between two time values, a detuning between a pump laser frequency and a cavity resonance frequency, and a ratio of two scale parameters. The first information may include a first time parameter, a first frequency parameter, and an intermediate frequency signal corresponding to the first electromagnetic signal. The second information may include a second time parameter, a second frequency parameter, and an intermediate frequency signal corresponding to the second electromagnetic signal. A cross ambiguity function related to the first electromagnetic signal, the second electromagnetic signal, a time derived from the first time parameter and the second time parameter, and a frequency derived from the first frequency parameter and the second frequency parameter is calculated.

A biphoton sensitive material may be used to detect a coincidence of the first modulated photons and the second modulated photons. The detection may include detecting indicia of biphoton absorption at a location along a magnetic field gradient. The detecting may include detecting at least one of fluorescence, phosphorescence, direct electron transfer, and ionization. The detecting may use an electronic coincidence counter. The detection information may include a number of detection events during a specified time period. The cross ambiguity function value may be related to a time offset and a frequency offset.

A second cross ambiguity function value related to a second time offset and a second frequency offset may be determined. A bandwidth of the first electromagnetic signals and the second electromagnetic signals may be on the order of, or exceed, one gigahertz. The modulating may include rotating polarizations of either the signal photons or the idler photons in proportion to the first information and rotating polarizations of the other of the signal photons or the idler photons in proportion to the second information. Producing the cross ambiguity function value may include calculating a square root and scaling.

According to another embodiment of the present invention, a system for and method of calculating a cross-ambiguity function is presented. Electromagnetic signals are received. Entangled photons are generated. The entangled photons are modulated with information relating to the received signals to produce modulated photons. The modulated photons are detected with a coincidence counter to produce a coincidence count. The coincidence count is used to produce a cross ambiguity function value for the electromagnetic signals.

Various additional features of the above embodiment include the following. The cross ambiguity function value may correspond to a difference between two time values, a detuning between a pump laser frequency and a cavity resonance frequency, and a ratio of two scale parameters. The cross ambiguity function value may be related to a time offset and a frequency offset. A second cross ambiguity function value related to a second time offset and a second frequency offset may be determined. A bandwidth of the electromagnetic signals may be on the order of, or exceed, one gigahertz. The modulating may include rotating polarizations of the entangled photons in proportion to the information relating to the received signals to produce modulated photons. Producing the cross ambiguity function value may include calculating a square root and scaling.

According to another embodiment of the present invention, a system for and method of calculating a cross-ambiguity function is presented. First electromagnetic signals are received at a first location. Second electromagnetic signals are received at a second location. Pump laser photons are produced. Entangled photons comprising signal photons and idler photons are produced from the pump photons. Either the signal photons or the idler photons are modulated with first information relating to the first electromagnetic signal to produce first modulated photons and the other of the signal photons or the idler photons are modulated with second information relating to the second electromagnetic signal to produce second modulated photons. The first modulated photons and the second modulated photons are directed to an optical cavity. The first modulated photons and the second modulated photons are directed from the optical cavity to a coincidence counter to produce a coincidence count. The coincidence count is used to produce a cross ambiguity function value for the first electromagnetic signals and the second electromagnetic signals.

Various additional features of the above embodiment include the following. The cross ambiguity function value may correspond to a difference between two time values, a detuning between a pump laser frequency and a cavity resonance frequency, and a ratio of two scale parameters. The first information may include a first time parameter, a first frequency parameter, and an intermediate frequency signal corresponding to the first electromagnetic signal. The second information may include a second time parameter, a second frequency parameter, and an intermediate frequency corresponding to the second electromagnetic signal. A cross ambiguity function related to the first electromagnetic signals, the second electromagnetic signals, a time derived from the first time parameter and the second time parameter, and a frequency derived from the first frequency parameter and the second frequency parameter may be calculated. The cross ambiguity function value may be related to a time offset and a frequency offset. A second cross ambiguity function value related to a second time offset and a second frequency offset may be determined. A bandwidth of the first electromagnetic signals and the second electromagnetic signals may be on the order of, or exceed, one gigahertz. The modulating may include rotating polarizations of one of the signal photons or the idler photons in proportion to the first information and rotating polarizations of the other of the signal photons or the idler photons in proportion to the second information. Producing the cross ambiguity function value may include calculating a square root and scaling.

According to another embodiment of the present invention, a system for and method of calculating a cross-ambiguity function is presented. Electromagnetic signals are received. Entangled photons are generated. The entangled photons are modulated with information relating to signals received by the receiving to produce modulated photons. Absorption of the modulated photons by a biphoton sensitive material is detected. Detection information derived from the detecting is used to produce a cross ambiguity function value relating to the electromagnetic signals.

Various additional features of the above embodiment include the following. The cross ambiguity function value may correspond to a difference between two time values, a detuning between a pump laser frequency and a cavity resonance frequency, and a ratio of two scale parameters. The detection information may include data representing indicia of biphoton absorption at a location along a magnetic field gradient. The indicia of biphoton absorption may include at least one of fluorescence, phosphorescence, direct electron transfer, and ionization. The detection information may include a number of biphoton absorptions detected during a specified time period. The cross ambiguity function value may be related to a time offset and a frequency offset. A second cross ambiguity function value related to a second time offset and a second frequency offset may be determined. A bandwidth of the electromagnetic signals may be on the order of, or exceed, one gigahertz. The modulating may include rotating polarizations of the entangled photons in proportion to the information. Producing the cross ambiguity function value may include calculating a square root and scaling.

According to another embodiment of the present invention, a system for and method of calculating a cross-ambiguity function is presented. A first electromagnetic signal is received at a first location. A second electromagnetic signal is received at a second location. A pump laser produces pump laser photons. Entangled photons comprising signal photons and idler photons are produced from the pump photons. Either the signal photons or the idler photons are modulated with first information relating to the first electromagnetic signal to produce first modulated photons, and the other of the signal photons or the idler photons are modulated with second information relating to the second electromagnetic signal to produce second modulated photons. The first modulated photons and the second modulated photons are directed to an optical cavity containing a biphoton sensitive material. Biphoton absorption of the first modulated photons and the second modulated photons by the biphoton sensitive material is detected. Information relating to the detecting is used to produce a cross ambiguity function value for the first electromagnetic signals and the second electromagnetic signals.

Various additional features of the above embodiment include the following. The cross ambiguity function value may correspond to a difference between two time values, a detuning between a pump laser frequency and a cavity resonance frequency, and a ratio of two scale parameters. The first information may include a first time parameter, a first frequency parameter, and an intermediate frequency signal corresponding to the first electromagnetic signal. The second information may include a second time parameter, a second frequency parameter, and an intermediate frequency signal corresponding to the second electromagnetic signal. A cross ambiguity function related to the first electromagnetic signal, the second electromagnetic signal, a time derived from the first time parameter and the second time parameter, and a frequency derived from the first frequency parameter and the second frequency parameter is calculated. The information relating to the detecting may include information of a location along a magnetic field gradient. The detecting may include detecting at least one of fluorescence, phosphorescence, direct electron transfer, and ionization. The information relating to the detecting may include a number of biphoton absorptions detected during a specified time period. The cross ambiguity function value may be related to a time offset and a frequency offset. A second cross ambiguity function value related to a second time offset and a second frequency offset may be determined. A bandwidth of the first electromagnetic signals and the second electromagnetic signals may be on the order of, or exceed, one gigahertz. The modulating may include rotating polarizations of either the signal photons or the idler photons in proportion to the first information and rotating polarizations of the other of the signal photons or the idler photons in proportion to the second information. Producing the cross ambiguity function value may include calculating a square root and scaling.

The accompanying drawings, which are incorporated in and constitute a part of this specification, illustrate various embodiments of the invention and, together with the description, serve to explain the principles and advantages of the invention.

DETAILED DESCRIPTION OF THE PREFERRED EMBODIMENTS

Figure 1:
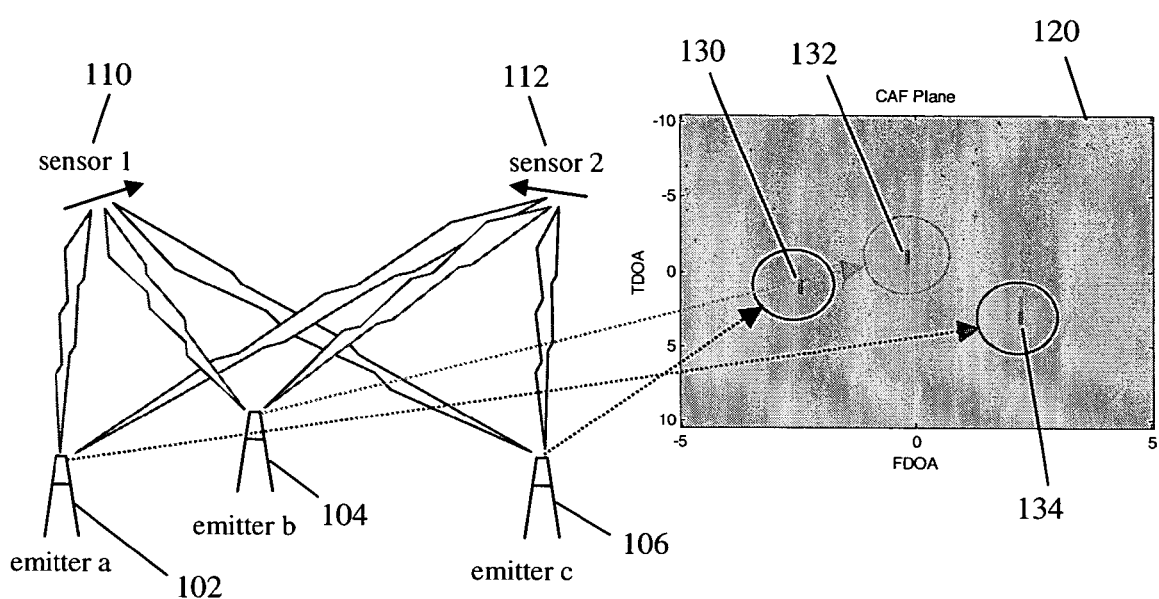
FIG. 1 is a schematic diagram depicting using the CAF to geolocate signal emitters according to an embodiment of the present invention.

FIG. 1 is a schematic diagram depicting the use of the CAF to geolocate signal emitters 102, 104, 106. Two sensors 110, 112 at different locations and moving at different velocities are used to detect emitters 102, 104, 106. Sensors 110, 112 may be antennas, directional or otherwise. The signal from an emitter arrives at different times at sensors 110, 112, depending on their distance from the emitter. The signals arrive Doppler-shifted differently at sensors 110, 112 depending on the relative motion between each sensor and the emitter. The signals (or their representations) from sensors 110, 112 are brought together using techniques known in the art. The CAF is then used to scan CAF plane 120 by testing multiple time difference of arrival (TDOA) and frequency difference of arrival (FDOA) points in CAF plane 120 according to the embodiment of FIG. 1. TDOA and FDOA parameters that produce a locally maximum CAF value (e.g., 130, 132, 134) correspond to a signal emitter. The physical location of the emitter is then derived from those particular TDOA and FDOA values using techniques known in the art. By way of non-limiting example, standard computer hardware, firmware, software, or a combination thereof may be used to derive data representing a physical location from CAF values.

The TDOA and FDOA themselves define surfaces in physical space. Assuming the emitter is on the surface of the Earth and stationary, the emitter must then lie at one of the points defined by intersection of these three surfaces. Other sensor arrangements may be used to locate a signal emitter without these assumptions. By way of non-limiting example, an embodiment of the present invention may use three sensors at three different locations to locate a signal emitter without requiring that it be located on the Earth's surface or be stationary.

Each emitter 102, 104, 106 results in a peak in the CAF at the TDOA and FDOA corresponding to the location of the emitter. That is, TDOA and FDOA parameters corresponding to emitters 102, 104, 106 produces local maxima in CAF values. Each receiver receives a signal that is a composite of the three signals emitted from emitters 102, 104, 106. Because the CAF peak is a function only of location for a given sensor geometry, the characteristics of the transmission (spread spectrum, frequency hopping, chirped, pulsed, CW, etc.) do not effect the location of the CAF peak in the CAF plane. Thus, a CAF may be used to locate multiple disguised-signal emitters.

Figure 2:
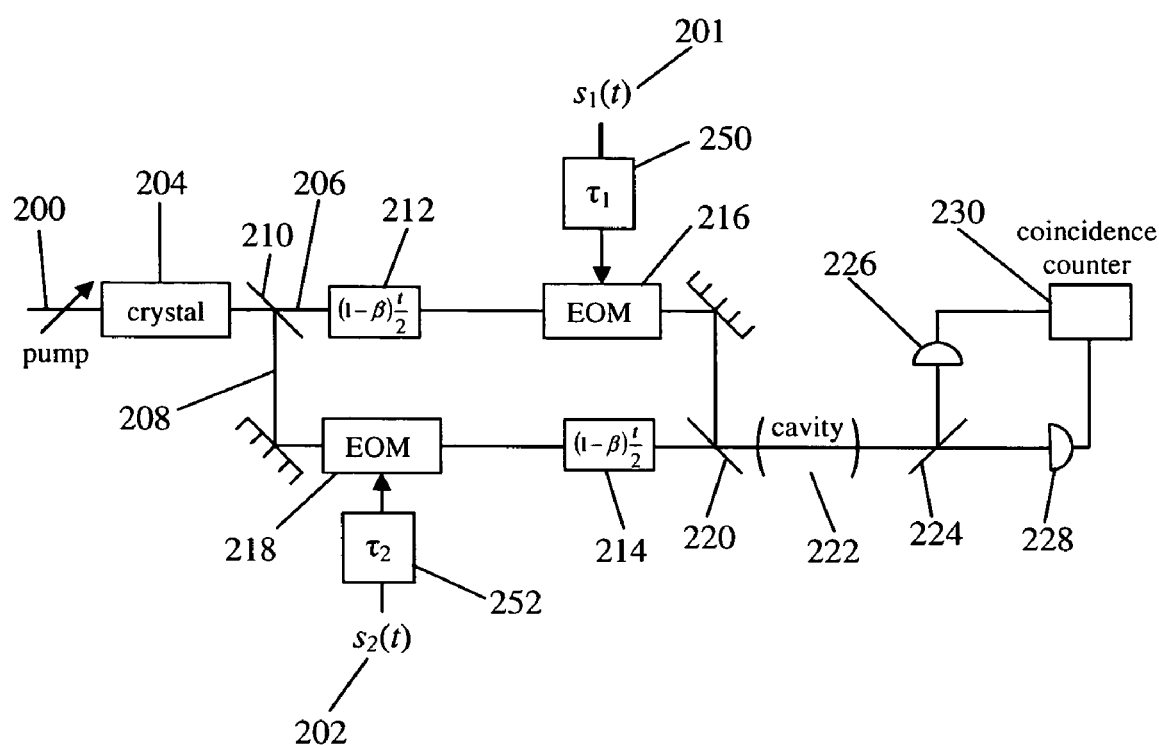
FIG. 2 is a schematic diagram depicting an embodiment of a quantum CAF generator.

FIG. 2 depicts an embodiment of a quantum CAF generator. In this embodiment, the CAF is calculated as a function of the time difference of arrival, frequency difference of arrival, and a scale difference. Here "scale difference" refers to differences in time scaling between two signals, which is due to relative motion of sensors relative to the emitter. For narrowband signals, the effects of relative motion can be considered as a Doppler shift and accounted for in a frequency offset, without requiring scaling. For broadband signals, the scale difference accounts for the frequency-dependent Doppler shift, and the frequency offset is related to the FDOA, receiver-dependent biases (such as downconversion differences), and scaling.

According to the embodiment of FIG. 2, a narrow tunable pump laser beam 200 is injected into a nonlinear crystal 204 (such as, by way of non-limiting example, beta barium borate or lithium niobate), where it undergoes parametric down conversion into signal photon beam 206 and idler photon beam 208. Thus, each pump photon is split into an entangled photon pair consisting of a signal photon and an idler photon. Signal photon beam 206 and idler photon beam 208 are separated using polarizing beam splitter 210. RF signals are received in a conventional manner (e.g., antennas) at two signal receivers and down converted to IF signals $s_1(t)$ 201 and $s_2(t)$ 202, respectively. Each of $s_1(t)$ 201 and $s_2(t)$ 202 may be electronically delayed by digital delays 250, 252, respectively. Signal photon beam 206 is delayed prior to modulation by a time dependent delay 212 to account for scaling. Idler photon beam 208 is delayed by an equivalent amount by time dependent delay 214 after modulation. Time dependent delays 212, 214 may be implemented using, by way of non-limiting example, materials that change refraction in response to electricity, mechanical movable mirrors, or slow light technology. Signal photon beam 206 and idler photon beam 208 are modulated with respective IF signals $s_1(t-\tau_1)$ and $s_2(t-\tau_2)$ as required by the particular embodiment of the present invention. The two beams are then combined using polarizing beam splitter 220 and injected into optical cavity 222, which is tuned near the pump laser center frequency. The output from cavity 222 is split by polarizing beam splitter 224, and the two signals are detected by detectors 226, 228 and correlated by means of coincidence counter 230.

Together, time dependent delays 212, 214 serve to introduce a scale term $\beta$. Time dependent delays 212, 214 may be set to cause the term $\beta$ to take on any values less than one. For calculating CAF values for $\beta$ greater than one, the embodiment of FIG. 2 may be configured to swap the signal receivers that respectively process $s_1(t)$ 201 and $s_2(t)$ 202.

The embodiment of FIG. 2 yields a coincidence count rate that is proportional to the magnitude squared of the CAF. This relation may be represented as, by way of non-limiting example:

$$\left\langle \Phi_{bi}\left(\tau_1 - \tau_2, \delta, \frac{\beta_1}{\beta_2}\right) - \overline{\Phi_{bg}} \right\rangle \propto \left| \int_0^{\Delta T} s_1(\beta_1 t - \tau_1) s_2(\beta_2 t - \tau_2) e^{-i\delta t} dt \right|^2. \quad (1)$$

In equation (1), $\tau = \tau_2 - \tau_1$ is a time offset, $\delta$ is a frequency offset, $\Delta T$ is a time measurement interval, and the brackets "⟨ ⟩" represent expected value. The symbol $\Phi_{bi}$ represents the biphoton count rate and the symbol $\Phi_{bg}$ represents the background count rate.

The term $\beta_1/\beta_2$ represents a scaling factor. More generally, the term $\beta_1/\beta_2$ may be written as $\beta$, the ratio of scaling factors for the two signals. The delays 212, 214 in the embodiment of FIG. 2, for example, introduce a scaling factor $\beta$ without requiring separate $\beta_1$ and $\beta_2$. One representation of $\beta$ in the embodiment of FIG. 2 yields $\beta_1 = \beta^{1/2}$ and $\beta_2 = \beta^{-1/2}$.

The embodiment of FIG. 2 may be used to scan the CAF plane by testing values of $\tau = \tau_2 - \tau_1$, $\delta$, and $\beta = \beta_1/\beta_2$ and measuring biphoton and background count rates to derive the CAF value for these parameters. Standard computer hardware, software, firmware, or any combination thereof may be used to process coincidence count data in accordance with equation (1) and derive a CAF value. This value may be output, stored, and/or forwarded for additional processing. Such additional processing may include, by way of non-limiting example, storing the value together with other related CAF values, graphically displaying the value, removing noise, or employing a maximum-locating algorithm or circuit.

The particular type of scanning depends on the embodiment and type of signal. For narrow-band signals, $\tau$ and $\delta$ are externally controlled to effect a scanning of the CAF plane. For broadband signals, scanning preferably occurs in $\beta$ instead of $\delta$, although $\delta$ still has to be set to account for receiver-dependent IF frequency differences. The frequency offset term $\delta$ is controlled by adjusting a cavity length or pump laser frequency as discussed further below.

Figure 3:
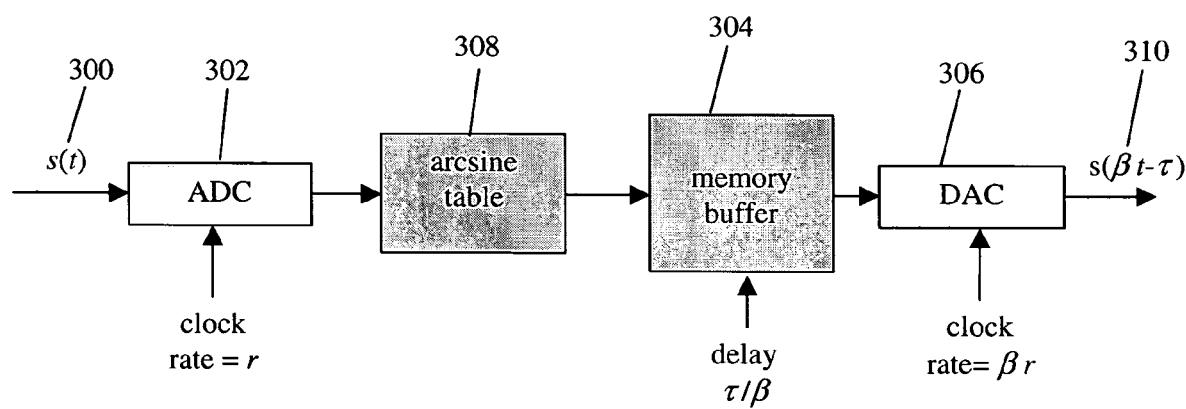
FIG. 3 is a schematic diagram depicting a digital delay line embodiment.

FIG. 3 depicts a digital delay line embodiment for delaying, by way of non-limiting example, the second IF signal by a given time offset, $\tau$. The analog input signal s(t) 300 is sampled at a very high rate using an analog to digital converter (ADC) 302, delayed in a digital buffer 304, and then converted back into an analog signal using a digital to analog converter (DAC) 306. Prior to conversion back to an analog signal, an arcsine function can be applied to the digital signal (via table lookup 308) to significantly reduce the higher order modulation terms. Finally, the DAC can be clocked at a different rate from the ADC to account for the scaling, $\beta$. When scaling is handled by the delay lines of FIG. 3, the time-dependent optical delays 212, 214 depicted in FIG. 2 are not required. In general, an IF signal s(t) 300 entering the delay line produces a signal s(βt−τ) 310 exiting the delay line.

In an embodiment of the present invention, the IF signals $s_1(t)$ 201, $s_2(t)$ 202 of FIG. 2 feed into the delay lines of FIG. 3, which, in turn, feed into the electro-optical modulators 216, 218, respectively, of FIG. 2. Preferably, both get the benefit of the arcsine conversion. The time offset τ is then the difference between the delays $\tau_2$, $\tau_1$ for the two inputs and can be either positive or negative. All the scaling can be handled on one input, or split between the two. By way of non-limiting example, the term β may be produced as a ratio of $\beta_1$ and $\beta_2$, which are respectively introduced by a first and second delay on $s_1$ and $s_2$ to respectively model $s_1(\beta_1 t - \tau_1)$ and $s_2(\beta_2 t - \tau_2)$. When the $\beta_i$ (for i=1,2) of an input stage is greater that one, some initial buffering is preferred to enable the DAC clock to run faster than the ADC clock without running out of data. Alternatively, since the scaling can be handled on either input, $\beta_i$ for both inputs can be reduced together (maintaining the same ratio) until neither is greater than one. For purposes of exposition, β will be left out of the remaining derivations; β may readily be reintroduced where applicable.

An analysis of the embodiment of FIG. 2 follows. In the absence of the cavity and the modulators, the two-photon coincidence rate is proportional to (see Rubin, Klyshko, Shih and Sergienko, Phys. Rev. Vol. 50 No. 6, December 1994, pp 5122) the biphoton amplitude, which may be expressed as, by way of non-limiting example:

$$R_c \propto \langle \psi | E_1^{(-)} E_2^{(-)} E_2^{(+)} E_1^{(+)} | \psi \rangle = |\langle 0 | E_2^{(+)} E_1^{(+)} | \psi \rangle|^2 = |A(\tau_1 \tau_2)|^2. \quad (2)$$

In equation (2), $\tau_i = T_i - s_i/c$ where $T_i$ is the measurement time and $s_i$ is the optical path length of the i-th photon for i=1,2. As shown in the above reference, the biphoton amplitude, A, can be written as, by way of non-limiting example:

$$A(\tau_1, \tau_2) = \eta_0 e^{i\frac{\omega_p}{2}(\tau_1+\tau_2)} e^{-i\frac{\omega_d}{2}(\tau_1-\tau_2)} \Pi(\tau_1 \tau_2). \quad (3)$$

In equation (3), $\eta_0$ is a normalization constant, $\omega_p$ represents the pump frequency, and $\omega_d$ represents the difference between signal and idler frequencies. The term Π(τ) represents the rectangle function, which may be expressed as, by way of non-limiting example:

$$\Pi(\tau) = \begin{cases} \frac{1}{DL}, & DL > \tau > 0, \\ 0, & \text{otherwise.} \end{cases} \quad (4)$$

Figure 4:
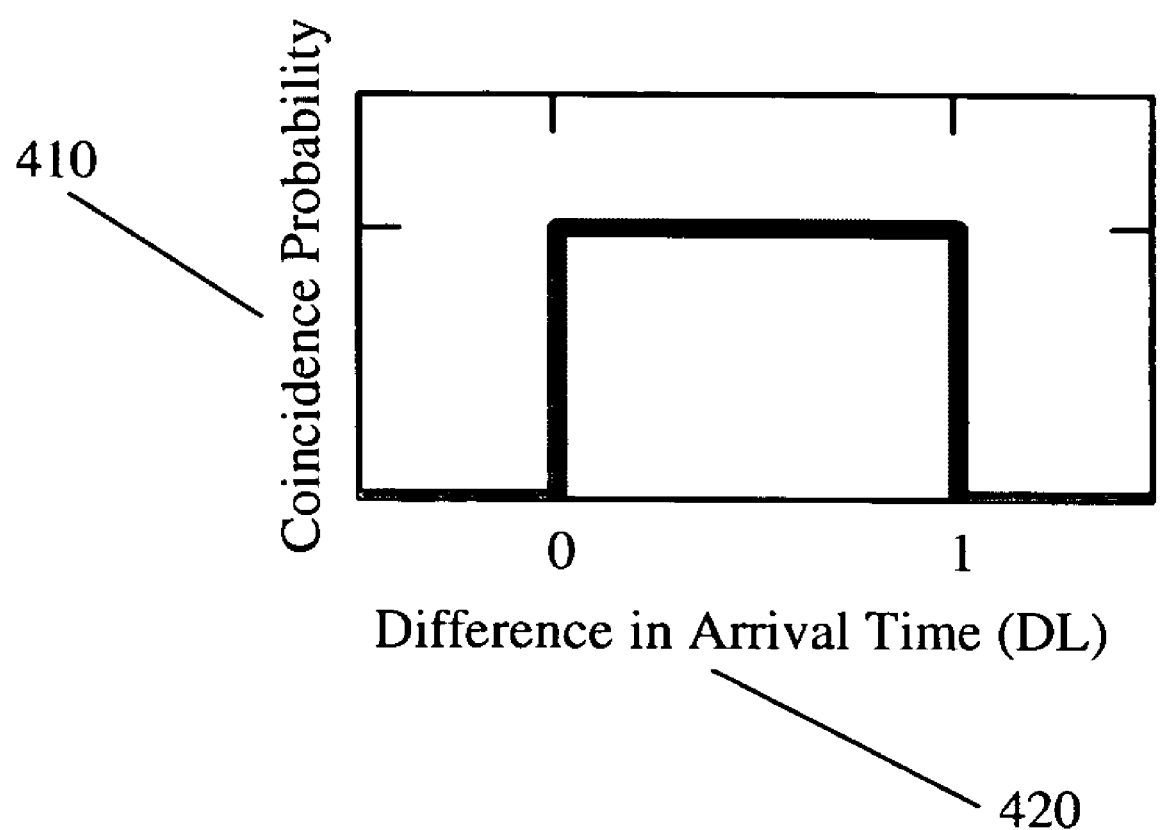
FIG. 4 is a schematic diagram depicting a rectangle function according to an embodiment of the present invention.

The symbol D represents the difference in the inverse group velocities of the ordinary and extraordinary rays in the crystal and L represents the length of the crystal. (For beta barium borate, D≈0.2 psec/mm.) The product DL determines the entanglement time. This probability amplitude can be interpreted as follows: If an idler photon is detected at time $T_2$, then (for equal path lengths) the probability that the signal photon is detected at time $T_1$ goes to zero for $T_1 < T_2$ or for $T_1 > T_2 + DL$. (A representative non-limiting graph of the rectangle function is depicted in FIG. 4. The y-axis 410 represents coincidence probability, and the x-axis 420 represents difference in arrival time, scaled to DL.)

The electro-optic modulators 216, 218 rotate the polarization of the signal photon beam 206 and idler photon beam 208 proportional to the IF input signals. Due to the polarization rotation, the second polarizing beam splitter 220 combines signal photon and idler photon beams with amplitudes that are equal to the sine of their respective rotation. More particularly, polarizing beam splitter 220 selectively passes e.g., vertical components of signal photon beam 206 and, e.g., horizontal components of idler photon beam 208 to cavity 222. Polarizing beam splitter 220 thus trims the amplitude of the signal photon beam 206 and idler photon beam 208 in accordance with the rotational modulated information. The net effect is to impose a temporal variation on the amplitudes of both the signal and idler beams, resulting in a biphoton amplitude that may be represented as, by way of non-limiting example:

$$A_{sig}(\tau_1, \tau_2, \tau) = \quad (5)$$
$$\sin(\kappa_1 s_1(\tau_1)) \sin(\kappa_2 s_2(\tau_2 - \tau)) \eta_0 e^{i\frac{\omega_p}{2}(\tau_1+\tau_2)} e^{-i\frac{\omega_d}{2}(\tau_1-\tau_2)} \Pi(\tau_1 - \tau_2).$$

In equation (5), $\tau_1$ and $\tau_2$ are as defined above in reference to equation (2), and τ is a time offset as defined above in reference to equation (1). The terms $\kappa_1$ and $\kappa_2$ are set to limit the magnitude of the argument of the sine functions to less than π/2. This limitation prevents aliasing of the sine function. If the sine function is represented as a power series, $$\sin(x) = x - \frac{x^3}{3!} + \frac{x^5}{5!} - \ldots, \quad (6)$$

then the signal and idler modulations can be written in terms of the IF signals plus higher-order terms. The higher order terms can be substantially suppressed by further reducing $\kappa_1$ and $\kappa_2$. Otherwise, the higher order terms might interfere with the desired CAF. For purposes of exposition, we will assume suppression of the higher order terms and make use of Fourier transforms to write, by way of non-limiting example:

$$A_{sig}(\tau_1, \tau_2, \tau) \approx \kappa_1 \kappa_2 \left( \int_{-\infty}^{\infty} S_1(\omega) e^{-i\omega \tau_1} d\omega \right) \quad (7)$$
$$\left( \int_{-\infty}^{\infty} S_2(\omega) e^{-i\omega(\tau_2-\tau)} d\omega \right) \eta_0 e^{i\frac{\omega_p}{2}(\tau_1+\tau_2)} e^{-i\frac{\omega_d}{2}(\tau_1-\tau_2)} \Pi(\tau_1 - \tau_2).$$

By independently modulating the signal photon beam and idler photon beam with two different (analog) signals, the biphoton probability amplitude is modulated by the product of the two signals. In general, this technique is useful for multiplying any two signals and may be implemented in signal processors other than CAF generators.

Still in reference to FIG. 2, the signal and idler photons are recombined into a single beam by the second polarizing beam splitter 224 and directed to optical cavity 222. Cavity 222 is characterized by the complex reflectance and transmittance coefficients of the two mirrors, $r_1$, $r_2$, $t_1$ and $t_2$. When a biphoton encounters a mirror, the wave function for each component photon is split into a transmitted component and a reflected component. The output from cavity 222 consists of biphotons whose component photons have each completed some number of round trips through cavity 222, each trip incurring an additional $2L_c$ of path length, where $L_c$ is the length of cavity 222. The total biphoton amplitude beyond cavity 222 can be written in terms of the modulated biphoton amplitude in the absence of cavity 222 as, by way of non-limiting example:

$$A_{cav}(\tau_1, \tau_2, \tau) = \sum_{n=0}^{\infty}\sum_{m=0}^{\infty} t_1^2 t_2^2 (r_1 r_2)^{n+m} A_{sig}\left(\tau_1 - \frac{2nL_c}{c}, \tau_2 - \frac{2mL_c}{c}, \tau\right). \quad (8)$$

Substituting for $A_{sig}$ yields the following non-limiting expression for biphoton amplitude beyond cavity 222:

$$A_{cav}(\tau_1, \tau_2, \tau) = \quad (9)$$

$$\kappa_1\kappa_2 \sum_{n=0}^{\infty}\sum_{m=0}^{\infty} t_1^2 t_2^2 (r_1 r_2)^{n+m} \eta_0 e^{i\frac{\omega_p}{2}(\tau_1+\tau_2)} e^{-i\frac{\omega_p}{2}\left(\frac{2(n+m)L_c}{c}\right)} e^{-i\frac{\omega_d}{2}(\tau_1-\tau_2)}$$

$$e^{-i\frac{\omega_p}{2}\left(\frac{2(n-m)L_c}{c}\right)}.$$

$$\int_{-\infty}^{\infty}\int_{-\infty}^{\infty} S_1(\omega_1)S_2(\omega_2) e^{-i\left[\omega_1\left(\tau_1-\frac{2nL_c}{c}\right)+\omega_2\left(\tau_2-\tau-\frac{2nL_c}{c}\right)\right]}$$

$$d\omega_2 d\omega_1 \Pi\left(\tau_1-\tau_2-\frac{2(n-m)L_c}{c}\right)$$

For path lengths set such that $0<\tau_1-\tau_2<DL$, $A_{cav}$ goes to zero for all terms where $m\neq n$. Keeping only the diagonal ($m=n$) elements, $A_{cav}$ may be expressed as, by way of non-limiting example:

$$A_{cav}(\tau_1, \tau_2, \tau) = \kappa_1\kappa_2\eta_0 e^{i\frac{\omega_p}{2}(\tau_1+\tau_2)} e^{-i\frac{\omega_d}{2}(\tau_1-\tau_2)} \quad (10)$$

$$\frac{t_1^2 t_2^2}{DL}\sum_{n=0}^{\infty}\left[(r_1 r_2)^{2n} e^{-i\omega_p\left(\frac{2nL_c}{c}\right)}\int_{-\infty}^{\infty}\int_{-\infty}^{\infty} S_1(\omega_1)S_2(\omega_2)\right.$$

$$\left. e^{-i[\omega_1\tau_1+\omega_2(\tau_2-\tau)-(\omega_1+\omega_2)\frac{2nL_c}{c}]} d\omega_2 d\omega_1\right] =$$

$$\kappa_1\kappa_2\eta_0 e^{i\frac{\omega_p}{2}(\tau_1+\tau_2)} e^{-i\frac{\omega_d}{2}(\tau_1-\tau_2)} e^{i(2\varphi_1+2\varphi_2)}\frac{T_1 T_2}{DL}$$

$$\int_{-\infty}^{\infty}\int_{-\infty}^{\infty}\frac{S_1(\omega_1)S_2(\omega_2)e^{-i[\omega_1\tau_1+\omega_2\tau_2-\omega_2\tau]}}{\left[1-R_1 R_2 e^{-i\left(\frac{\omega_p-(\omega_1+\omega_2)}{c}2L_c-2\phi_1-2\phi_2\right)}\right]}d\omega_2 d\omega_1$$

In equation (10), the terms $\phi_i$ represent phase shift picked up by the photons as a result of the transmittance $t_i$ of the mirrors for $i=1,2$. Similarly, the terms $\phi_i$ represent phase shift picked up by the photons as a result of the reflectance $r_i$ of the mirrors for $i=1,2$. The terms $T_i$ represent the intensity transmittances corresponding to complex transmittance coefficients $t_i$ and the terms $R_i$ represent the intensity reflectances corresponding to complex reflectance coefficients $r_i$ for $i=1,2$. With a change of variables ($\omega_1=\omega$, $\omega_2=v-\omega$) this expression may be written as, by way of non-limiting example:

$$A_{cav}(\tau_1, \tau_2, \tau) = \quad (11)$$

$$\kappa_1\kappa_2\eta_0 e^{i\frac{\omega_p}{2}(\tau_1+\tau_2)} e^{-i\frac{\omega_d}{2}(\tau_1-\tau_2)} e^{i(2\varphi_1+2\varphi_2)}\frac{T_1 T_2}{DL}$$

$$\int_{-\infty}^{\infty} e^{-iv\tau_2}\frac{\int_{-\infty}^{\infty} S_1(\omega)S_2(v-\omega)e^{-i[(\omega)(\tau_1-\tau_2)-(v-\omega)\tau]}d\omega}{\left[1-R_1 R_2 e^{-i\left(\frac{\omega_p-v}{c}2L_c-2\phi_1-2\phi_2\right)}\right]}dv$$

The denominator has a minimum magnitude when the modulated biphoton is resonant with the cavity, which occurs when, by way of non-limiting example:

$$\frac{\omega_p-v}{c}L_c - \phi_1 - \phi_2 = q\pi = \frac{\omega_{res}}{c}L_c - \phi_1 - \phi_2 \quad (12)$$

In equation (12), q may be any integer. Cavity biphoton resonance is a consequence of the frequency entanglement which requires that the sum of the frequencies of the signal and idler photons of a biphoton pair equal the frequency of the pump beam, even though the signal and idler beams are themselves rather broad in frequency. When the pump beam frequency is detuned from the biphoton resonance frequency, the biphoton resonance condition is only met for pairs of signals that differ in frequency by the same amount as the detuning. Thus the detuning between pump and cavity effectively select the frequency offset.

If cavity 222 is made sufficiently short, the spacing between resonant modes (the free spectral range) can be made to exceed the bandwidth of the modulating signals. In this case, we can take $\omega_{res}$ to be the biphoton resonant frequency closest to the pump frequency. This may be expressed as, by way of non-limiting example:

$$\omega_{res} = \frac{\pi c}{L_c}\left[nint\left(\frac{1}{\pi}\left(\frac{\omega_p}{c}L_c - \phi_1 - \phi_2\right)\right) + \frac{\phi_1+\phi_2}{\pi}\right]. \quad (13)$$

The minimum denominator occurs when $v$ is the difference between the pump frequency and the biphoton resonance frequency ($v=\omega_p-\omega_{res}$). Note that it is the difference between the pump frequency and the biphoton resonance frequency that determines the frequency offset ($v$ or $\delta$), so that either the pump frequency or the cavity length can be changed to select the frequency offset, which ever is the most convenient.

The probability that the two components of the biphoton arrive within a very short interval (~DL) is equal to the magnitude squared of the biphoton probability amplitude integrated over this short time, which may be expressed as, by way of non-limiting example:

$$P_{cav}(\tau_1, \tau, \omega_{res}) = \int_{\tau_1-DL}^{\tau_1} |A_{cov}(\tau_1, \tau_2, \tau)|^2 \, d\tau_2 \quad (14)$$

$$= \left(\frac{\kappa_1\kappa_2\eta_0 T_1 T_2}{DL}\right)^2 \int_{\tau_1-DL}^{\tau_1} \left| \int_{-\infty}^{\infty} e^{-i\nu\tau_2} \frac{\int_{-\infty}^{\infty} S_1(\omega)S_2(\nu-\omega)e^{-i[\omega(\tau_1-\tau_2)-(\nu-\omega)\tau]}\,d\omega}{1 - R_1 R_2 e^{-i\left(\frac{\omega_p-\omega_{res}-\nu}{c}2L_c\right)}} \, d\nu \right|^2 d\tau_2$$

$$\int_{-\infty}^{\infty}\int_{-\infty}^{\infty} S_1(\omega)S_2(\nu-\omega) e^{i(\nu-\omega)\left(\tau+\frac{DL}{2}\right)}$$

$$S_1^*(\omega')S_2^*(\nu'-\omega')e^{-i(\nu'-\omega')\left(\tau+\frac{DL}{2}\right)}$$

$$= \left(\frac{\kappa_1\kappa_2\eta_0 T_1 T_2}{DL}\right)^2 \int_{-\infty}^{\infty}\int_{-\infty}^{\infty} e^{-i(\nu-\nu')\tau_1} \frac{\text{sinc}\left(\frac{DL}{2\pi}(\nu-\omega-\nu'+\omega')d\omega\,d\omega'\right)}{\left(1-R_1R_2e^{-i\left(\frac{\omega_p-\omega_{res}-\nu}{c}2L_c\right)}\right)} \, d\nu\,d\nu'$$
$$\left(1-R_1R_2e^{i\left(\frac{\omega_p-\omega_{res}-\nu'}{c}2L_c\right)}\right)$$

If the probability of coincidence is averaged over the time $\Delta T$, in the limit as $\Delta T$ goes to infinity, the leftmost exponential term can be replaced with a delta function ($\delta(\nu-\nu')$). This replacement is appropriate as a close approximation.

With $\tau \gg DL$ and recognizing that the sinc function is essentially equal to one (since DL is on the order of picoseconds while the frequencies are only GHz) we get, by way of non-limiting example:

$$\overline{P_{cav}}(\tau, \omega_{res}) = \frac{1}{\Delta T} \frac{(\kappa_1\kappa_2\eta_0 T_1 T_2)^2}{DL} \int_{-\infty}^{\infty} \frac{\left(\int_{-\infty}^{\infty} S_1(\omega)S_2(\nu-\omega)e^{-i\omega\tau}\,d\omega\right)}{\left|1-R_1R_2e^{-i\left(\frac{\omega_p-\omega_{res}-\nu}{c}2L_c\right)}\right|^2} \, d\nu \quad (15)$$

$$= \frac{1}{\Delta T} \frac{(\kappa_1\kappa_2\eta_0 T_1 T_2)^2}{DL} \int_{-\infty}^{\infty} \frac{\left|\int_{-\infty}^{\infty} S_1(\omega)S_2^*(\omega-\nu)e^{-i\omega\tau}\,d\omega\right|^2}{\left|1-R_1R_2e^{-i\left(\frac{\omega_p-\omega_{res}-\nu}{c}2L_c\right)}\right|^2} \, d\nu$$

For a very high Q cavity, the denominator becomes very small when $\nu \approx \omega_p - \omega_{res}$. Evaluating the numerator at this FDOA, pulling it out of the integral and evaluating the remaining integral only over the IF signal bandwidth, yields, by way of non-limiting example:

$$\overline{P_{cav}}(\tau, \omega_{res}) \approx \frac{1}{\Delta T} \frac{(\kappa_1\kappa_2\eta_0 T_1 T_2)^2}{DL} \left| \int_{-\infty}^{\infty} S_1(\omega)S_2^*(\omega-(\omega_p-\omega_{res}))e^{-i\omega\tau}\,d\omega \right|^2 \quad (16)$$

$$\int_{\omega_p-\omega_{res}-\frac{\Omega}{2}}^{\omega_p-\omega_{res}+\frac{\Omega}{2}} \frac{1}{\left|1-R_1R_2e^{-i\left(\frac{\omega_p-\omega_{res}-\nu}{c}2L_c\right)}\right|^2} \, d\nu$$

$$\approx \frac{1}{\Delta T} \frac{(\kappa_1\kappa_2\eta_0)^2}{DL} \left| \int_{-\infty}^{\infty} S_1(\omega)S_2^*(\omega-(\omega_p-\omega_{res}))e^{-i\omega\tau}\,d\omega \right|^2$$

$$\left(\frac{(T_1T_2)^2}{1-R_1^2R_2^2}\right)\left[\Omega + 2\frac{c}{L_c}\tan^{-1}\left(\frac{R_1R_2\sin\left(\frac{\Omega L_c}{c}\right)}{1-R_1R_2\cos\left(\frac{\Omega L_c}{c}\right)}\right)\right]$$

An additional simplification is possible when the IF signal bandwidth $\Omega$ is much greater than the biphoton resonance width and less than the free spectral range. This condition may be expressed by way of non-limiting example as:

$$\frac{c}{2L_c}(2 - R_1 - R_2) \ll \Omega < \frac{\pi c}{L_c}. \tag{17}$$

When the condition represented in equation (17) obtains, the bracketed term in equation (16) is approximately equal to the free spectral range, and the average probability of biphoton coincidence may be expressed as, by way of non-limiting example:

$$\overline{P_{cav}(\tau, \omega_{res})} \approx \frac{1}{\Delta T} \frac{(\kappa_1 \kappa_2 \eta_0)^2}{DL} \tag{18}$$

$$\left| \int_{-\infty}^{\infty} S_1(\omega) S_2^*(\omega - (\omega_p - \omega_{res})) e^{-i\omega\tau} d\omega \right|^2 \left( \frac{(T_1 T_2)^2}{1 - R_1^2 R_2^2} \right) \frac{\pi c}{L_c}.$$

Finally, for a lossless cavity with identical mirrors (which simplifies the exposition but is not meant to be limiting), the average probability of biphoton coincidence may be expressed as, by way of non-limiting example:

$$\overline{P_{cav}(\tau, \omega_{res})} \approx \tag{19}$$

$$\frac{1}{\Delta T} \frac{(\kappa_1 \kappa_2 \eta_0)^2}{DL} \left| \int_{-\infty}^{\infty} S_1(\omega) S_2^*(\omega - (\omega_p - \omega_{res})) e^{-i\omega\tau} d\omega \right|^2$$

$$\left( \frac{(1-R)^3}{(1+R)(1+R^2)} \right) \frac{\pi c}{L_c}.$$

The scale factor $\beta$ may be inserted in equation (19) in analogy with equation (1). In particular, the arguments of $S_1$ and $S_2$ may be divided by $\beta_1$ and $\beta_2$, respectively. Assuming by way of non-limiting example a very narrow pump beam, the frequency resolution $\Delta\omega$ of the CAF may be given by the width of the biphoton resonance. This relation may be expressed as, by way of non-limiting example:

$$\Delta\omega = \frac{c}{L_c}(1 - R). \tag{20}$$

Figure 5:
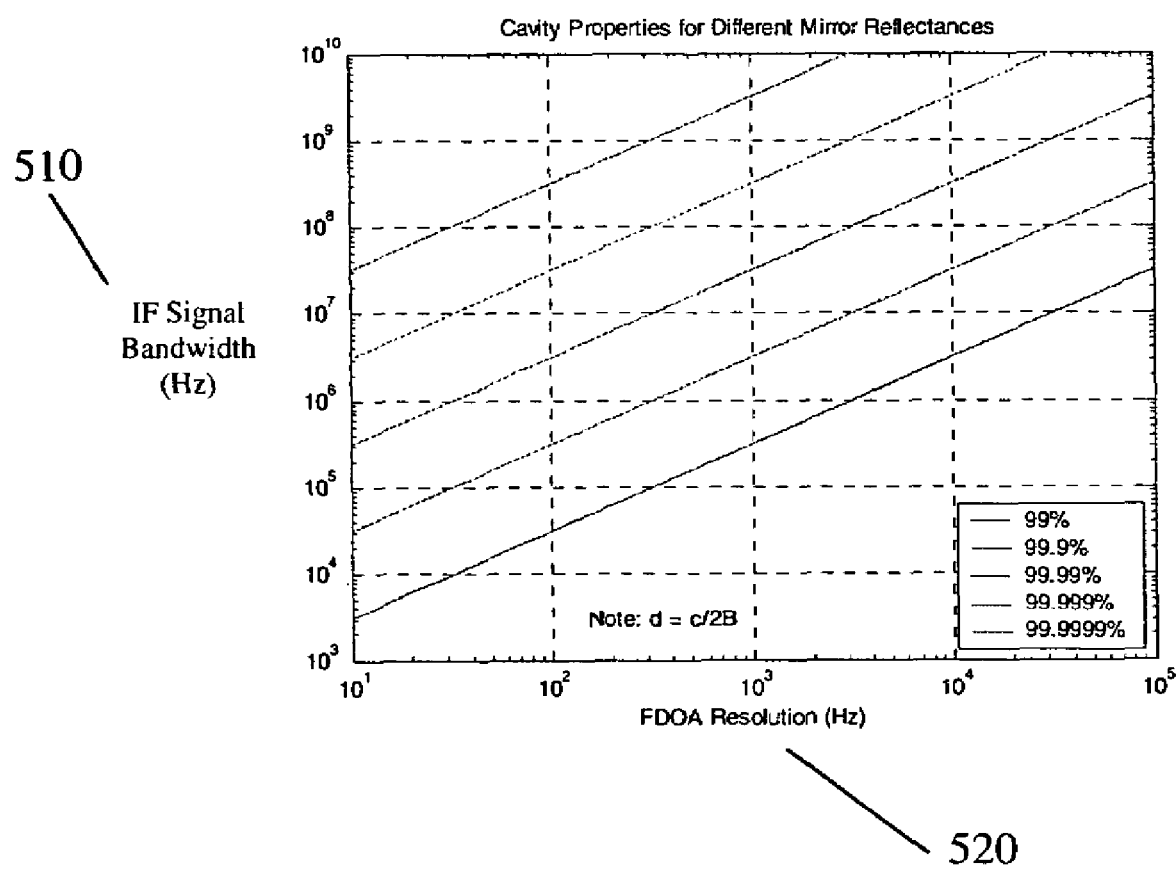
FIG. 5 is a chart depicting signal bandwidth as a function of FDOA resolution for several cavities with different mirror reflectance according to various embodiments of the present invention.

FIG. 5 depicts IF signal bandwidth 510 as a function of FDOA resolution 520 for several cavities with different mirror reflectance. The ratio of the FDOA resolution to the IF signal bandwidth may be derived from equation (20) and represented as, by way of non-limiting example:

$$\frac{\Delta\omega}{\Omega} > \frac{(1-R)}{\pi}. \tag{21}$$

This ratio indicates the granularity of the measurements possible within the IF bandwidth. The resolution may, however, be degraded somewhat due to finite averaging time and signal-to-noise issues.

The time resolution of the CAF is related to the signal bandwidth, and the signal-to-noise ratio. The signal-to-noise ratio ("SNR") is calculated presently. The probability of detection for a single photon (either signal or idler) is given as, by way of non-limiting example:

$$\overline{P_j} = \frac{1}{\Delta T} \overline{|\kappa_j s_j(t)|^2} \int_{\frac{\omega_p}{2} - \frac{\Omega_j}{2}}^{\frac{\omega_p}{2} + \frac{\Omega_j}{2}} I_j(\omega) \tag{22}$$

$$\frac{T_1 T_2}{\left| 1 - \sqrt{R_1 R_2} \, e^{i(2L_c \frac{\omega}{c} + \phi_1 + \phi_2)} \right|^2} d\omega.$$

In equation (22), the term $I(\omega)$ represents the spectral distribution of the signal and idler photons, and the index j indicates either signal or idler. If the length of the cavity is such that q of equation (12) is odd, then the signal and idler beams are centered on a transmission null. If the free spectral range of the cavity is made greater than the width of the spectral distribution of the beams ($\Omega_j$), then for a very high Q cavity this can be approximated as, by way of non-limiting example:

$$\overline{P_j} \approx \frac{1}{\Delta T} \overline{|\kappa_j s_j(t)|^2} \frac{4}{\pi} \frac{T_1 T_2}{(1 + \sqrt{R_1 R_2})^2} \tag{23}$$

$$= \frac{4}{\Delta T \pi} \overline{|\kappa_j s_j(t)|^2} \frac{(1-R)^2}{(1+R)^2}.$$

Equation (23) assumes for purposes of exposition and by way of non-limiting example that the mirrors are identical and lossless. The signal coincidence count rate can be written as, by way of non-limiting example:

$$\Phi_{cc\_bi} = \Phi_{bi} \overline{P_{cav}} = \frac{\Phi}{\Delta T} \frac{(\kappa_1 \kappa_2 \eta_0)^2}{DL} \tag{24}$$

$$\left| \int_{-\infty}^{\infty} S_1(\omega) S_2^*(\omega - (\omega_p - \omega_{res})) e^{-i\omega\tau} d\omega \right|^2$$

$$\left( \frac{(1-R)^3}{(1+R)(1+R^2)} \right) \frac{\pi c}{L_c}.$$

Factors of $\beta$ may be inserted into the arguments of $S_1$ and $S_2$ here in analogy with equation (1). The accidental coincidence rate can be written as, by way of non-limiting example:

$$\Phi_{cc\_bg} = \Phi_{bi}^2 \overline{P_s P_i} T_c = \frac{(4\Phi_{bi} \kappa_1 \kappa_2)^2}{(\Delta T \pi)^2} \overline{|s_1(t)|^2 |s_2(t)|^2} \frac{(1-R)^4}{(1+R)^4} T_c. \tag{25}$$

In equation (25), $T_c$ represents the coincidence interval. Recognizing that $\eta_0^2 = DL$ in general, the background-limited signal-to-noise may be represented as, by way of non-limiting example:

$$SNR_{bg} = \frac{\Phi_{cc\_bi}}{\sqrt{2B\Phi_{cc\_bg}}} = \left| \int_{-\infty}^{\infty} S_1(\omega) S_2^*(\omega - (\omega_p - \omega_{res})) \right| \tag{26}$$

-continued $$e^{-i\omega\tau} d\omega\Big|^2 \frac{\kappa_1 \kappa_2 \pi^2 c}{4L_c \sqrt{2BT_c |s_1(t)|^2 |s_2(t)|^2}} \frac{(1-R^2)}{(1+R^2)}$$

In equation (26), B is the bandwidth (inverse integration time) of the coincident counter. The photon noise limited signal-to-noise may be represented as, by way of non-limiting example:

$$SNR_{shot} = \frac{\Phi_{bi}}{\sqrt{2B\Phi_{bg}}} = \kappa_1 \kappa_2 \sqrt{\frac{\Phi\pi c}{2B\Delta TL_c} \frac{(1-R)^3}{(1+R)(1+R^2)}} \quad (27)$$

$$\left|\int_{-\infty}^{\infty} S_1(\omega) S_2^*(\omega - (\omega_p - \omega_{res})) e^{-i\omega\tau} d\omega\right|.$$

The total SNR may be represented as, by way of non-limiting example:

$$SNR = \frac{SNR_{bg} SNR_{shot}}{\sqrt{SNR_{bg}^2 + SNR_{shot}^2}}. \quad (28)$$

In some embodiments of the present invention, the IF signals entering the electro-optical modulators are conditioned by the delay lines of FIG. 3, and no separate delay lines for $\tau_1$, $\tau_2$ as depicted in FIG. 2 or delay lines of $(1-\beta)t/2$ in the optical pathways as depicted in FIG. 2 are required. In such embodiments, the signal and idler beams are respectively modulated with IF signals $s_1(\beta_1 t - \tau_1)$ and $s_2(\beta_t t - \tau_2)$.

Note that in some embodiments of the present invention, the only limitation on bandwidth is the speed of the ADC, DAC, and EOM components of FIGS. 2 and 3. These components preferably operate at twice the frequency of the bandwidth under consideration.

In some embodiments of the present invention, the delay line of FIG. 3 may be used to temporarily store the received signals and clock them out repeatedly at a much faster rate to modulate the photon beams while changing any, or a combination of, time, frequency, and scale parameters. In this way, multiple CAF values can be computed for each signal snapshot. The output rate can be an order of magnitude faster than the input. During such temporary storage, more data on the received signals may be gathered.

In some embodiments of the present invention, different ways of modulating the signal and idler photon beams are contemplated. Such techniques include, by way of non-limiting example, a Mach-Zender modulator, acousto-optic modulator, or other type of modulator. Other parameters may be modulated instead of or in addition to polarization. Such parameters include, by way of non-limiting example, intensity and frequency.

Entangled photons may be produced according to a variety of methods. By way of non-limiting example, entangled photons may be produced according to types I or II parametric down-conversion. Furthermore, any nonlinear crystal, not limited to beta barium borate or lithium niobate, may be used. Other ways to produce entangled photons include: excited gasses, materials without inversion symmetry, and generally any properly phase-matched medium. Entangled photon production consistent with this disclosure is not limited to using any particular non-linear crystal. Furthermore, the entangled photons are not limited to any particular wavelength or frequency. Biphotons whose constituent signal and idler photons are orthogonally polarized may be used as well as biphotons whose constituent signal and idler photons are polarized in parallel.

In some embodiments of the present invention, the cavity and coincidence counter are replaced with a cell containing a biphoton sensitive material ("BSM"), such as, by way of non-limiting example, rubidium-87 ($^{87}$Rb). Such a substance typically has a two-photon absorption line near the pump frequency that fluoresces following absorption of a biphoton pair. A magnetic field can be used to detune the absorption line from the pump frequency in order to measure the FDOA. Detectors along the cell measure the fluorescence. A magnetic field gradient results in detuning that is a function of the distance along the cell. Signals with different FDOAs would then fluoresce at different locations within the cell. Essentially, the magnetic field gradient replaces, or supplements, the detuning between the cavity and the pump laser. Thus, detecting fluorescence in a BSM cell at particular locations along a magnetic field gradient indicates particular FDOAs. In such embodiments, CAF values for multiple FDOAs could be measured at once. In embodiments that employ a BSM, the magnetic field gradient reduces or eliminates the need to scan frequency difference parameters. In BSM embodiments, the number of biphoton absorptions detected during a specified time period (e.g., as $\tau_1$ and/or $\tau_2$ are changed) is used to derive TDOA information in analogy with embodiments that employ a coincidence counter.

In some embodiments of the present invention that employ a BSM cell, indicia other than fluorescence may be used to detect entangled photon absorption. By way of non-limiting example, entangled-photon absorption may result in fluorescence, phosphorescence, direct electron transfer, or ionization of the absorbing material. Detecting fluorescence, phosphorescence, direct electron transfer, or ionization may be used to detect entangled-photon absorption. Also by way of non-limiting example, avalanche photodiodes, photo multiplier tubes (PMT), or other devices may be used to detect the fluorophotons, ionization, direct electron transfer, or other absorption indicia at particular locations in the BSM cell.

Scanning the CAF plane may be accomplished in various ways in embodiments of the present invention. Embodiments with multiple DACs, cavities, and detectors could be used to simultaneously compute many points on a CAF plane. In some embodiments, these techniques obviate the need for scanning entirely for the broadband case. For the narrow-band case, multiple delay lines and cavities with the gradient-dependent BSM efficiently scans the CAF plane.

The following considerations are with regard to calibration. It may be preferable in some embodiments to use collimated white light to adjust for equal path lengths, since the short coherence length yields only a few fringes. In some embodiments of the present invention, one modulator is driven with a frequency equal to half the free spectral range, which results in transmission through the cavity if the cavity is tuned to be resonant to the pump but not resonant to signal and idler (e.g., if 2L is an odd number of pump wavelengths, where L is the cavity length). Scanning the modulation frequency is a way to determine where the cavity is tuned.

Some embodiments of the present invention may be useful for bi-static RADAR. Locating objects using the reflection of GPS signals by correlating reflection (multipath) with a direct path from a satellite is possible. TDOA plus ephemeris for multiple satellites yields location. FDOA is useful for identifying specific satellites (e.g., GPS satellites).

In some embodiments of the present invention, parallel quantum CAF function generators are possible. Such generators allow simultaneous processing of multiple CAF elements. This may be accomplished by way of multiple ratios of scaling factors and time offsets ($\beta$ and $\tau$, respectively), and can be generated with a single analog-to-digital converter and multiple digital-to-analog converters.

In some embodiments of the present invention, the residual signal photon beam and idler photon beam components that are not directed to cavity 222 by polarizing beam splitter 220 in the embodiment of FIG. 2 are directed to a second cavity and coincidence counter. Such a combination allows for additional QCAF processing. The residual orthogonal components sent to the second cavity are proportional to one minus the components that are directed to cavity 222. By injecting these components into the second cavity (e.g., one identical to cavity 222), a useful signal results (e.g., identical to the signal produced by coincidence counter 230). Such a second cavity preferably has a detuning that is sufficiently far away from zero or any of the component IF frequencies of $s_1(t)$ 201 or $s_2(t)$ 202 to avoid undesirable resonance peaks. Two FDOAs may be evaluated at once if the second cavity is detuned from the pump beam differently from cavity 222.

In some embodiments of the present invention, the delay lines of FIG. 2 need not include differential clock rate capability. In such embodiments, tuning the pump laser or adjusting the cavity length alone are sufficient for adjusting the Doppler factor or scaling factor. These embodiments are particularly useful for detecting narrowband RF signals.

In some embodiments of the present invention, time dependent optical delays may be inserted before and after the electro-optical modulators to account for scaling. For short optical delays, optical modulators, which change the index of refraction in response to voltage, can be used. Other ways to introduce optical delays include lengths of optical fiber, which may be switched in and out of the path by way of optical switches.

The equations contained in this disclosure are illustrative and representative and are not meant to be limiting. Alternate equations may be used to represent the same phenomena described by any given equation. In particular, the equations disclosed herein may be modified by adding error-correction terms, higher-order terms, or otherwise accounting for physical inaccuracies, using different names for constants or variables, or using different expressions. Other modifications, substitutions, replacements, or alterations of the equations may be performed. Further, the symbols, variables, and parameters in each equation or formula are to be interpreted for that specific equation or formula. That is, each symbol, variable, and parameter is to be interpreted with respect to the equation or formula in which it appears. The same symbol may be used to represent different quantities in different equations or formulas in the present disclosure.

While the foregoing description includes details and specificities, it should be understood that such details and specificities have been included for the purposes of explanation only, and are not to be interpreted as limitations of the present invention. Many modifications to the embodiments described above can be made without departing from the spirit and scope of the invention, as it is intended to be encompassed by claims and their legal equivalents.

What is claimed is:

1. A method of calculating a cross-ambiguity function comprising:
    receiving electromagnetic signals;
    generating entangled photons;
    modulating the generated entangled photons with information relating to the received signals to produce modulated photons;
    detecting the modulated photons and generating detection information therefrom;
    producing, using computer hardware, a cross ambiguity function value relating to the electromagnetic signals based at least in part on the detection information derived; and
    outputting a signal representing the cross ambiguity function value.

2. The method of claim 1 wherein the detecting step comprises detecting using a biphoton sensitive material.

3. The method of claim 2 wherein the detection information comprises data representing indicia of biphoton absorption at a location along a magnetic field gradient.

4. The method of claim 2 wherein the step of detecting comprises detecting at least one indicia selected from the group consisting of: fluorescence, phosphorescence, direct electron transfer, and ionization.

5. The method of claim 1 wherein the step of detecting comprises detecting using an electronic coincidence counter.

6. The method of claim 1 wherein the detection information comprises a number of biphoton detection events detected during a specified time period.

7. The method of claim 1 wherein the cross ambiguity function value is related to a time offset and a frequency offset.

8. The method of claim 1 further comprising determining a second cross ambiguity function value related to a second time offset and a second frequency offset.

9. The method of claim 1 wherein a bandwidth of the electromagnetic signals is on the order of one gigahertz.

10. The method of claim 1 wherein a bandwidth of the electromagnetic signals exceeds one gigahertz.

11. The method of claim 1 wherein the step of modulating comprises rotating polarizations of the entangled photons in proportion to the information.

12. A method of calculating a cross-ambiguity function comprising:
    receiving a first electromagnetic signal at a first location;
    receiving a second electromagnetic signal at a second location;
    producing pump laser photons;
    generating entangled photons from the pump laser photons, the entangled photons comprising a first group and a second group, each photon from the first group being entangled with a photon from the second group;
    modulating at least a portion of photons from the first group with first information relating to the first electromagnetic signal to produce first modulated photons;
    modulating at least a portion of photons from the second group with second information relating to the second electromagnetic signal to produce second modulated photons;
    directing the first modulated photons and the second modulated photons to an optical cavity;
    detecting the first modulated photons and the second modulated photons;
    calculating, using computer hardware, a cross ambiguity function value for the first electromagnetic signals and the second electromagnetic signals based at least in part on information derived from at least some of the detected first modulated photons and the second modulated photons; and outputting a signal representing the cross ambiguity function value.

13. The method of claim 12 wherein the first information comprises a first time parameter, a first frequency parameter, and an intermediate frequency signal corresponding to the first electromagnetic signal.

14. The method of claim 13 wherein:
the second information comprises a second time parameter, a second frequency parameter, and an intermediate frequency signal corresponding to the second electromagnetic signal; and
the step of calculating comprises calculating a cross ambiguity function value related to the first electromagnetic signal, the second electromagnetic signal, a time derived from the first time parameter and the second time parameter, and a frequency derived from the first frequency parameter and the second frequency parameter.

15. The method of claim 12 wherein the step of detecting comprises detecting using a biphoton sensitive material.

16. The method of claim 15 wherein the step of detecting comprises detecting indicia of biphoton absorption at a location along a magnetic field gradient.

17. The method of claim 15 wherein the step of detecting comprises detecting indicia selected from the group consisting of: fluorescence, phosphorescence, direct electron transfer, and ionization.

18. The method of claim 12 wherein the step of detecting comprises detecting using an electronic coincidence counter.

19. The method of claim 12 wherein the detection information comprises a number of detection events during a specified time period.

20. The method of claim 12 wherein the step of calculating comprises calculating a square root and scaling.

21. The method of claim 12 wherein a bandwidth of the first electromagnetic signals and the second electromagnetic signals is on the order of one gigahertz.

22. The method of claim 12 wherein a bandwidth of the first electromagnetic signals and the second electromagnetic signals exceeds one gigahertz.

23. The method of claim 12 wherein the step of modulating at least a portion of photons from the first group comprises rotating photon polarizations in proportion to the first information and the step of modulating at least a portion of photons from the second group comprises rotating photon polarizations in proportion to the second information.

24. A method of computing a cross-ambiguity function comprising:
receiving electromagnetic signals;
generating entangled photons;
modulating the entangled photons with information relating to the received electromagnetic signals received by the receiving to produce modulated photons;
detecting the modulated photons with a coincidence counter to produce a coincidence count;
deriving, using computer hardware, a cross ambiguity function value for the electromagnetic signals from the coincidence; and
outputting a signal representing the cross ambiguity function value.

25. The method of claim 24 wherein the using comprises calculating a square root and scaling.

26. The method of claim 24 wherein a bandwidth of the electromagnetic signals is on the order of one gigahertz.

27. The method of claim 24 wherein a bandwidth of the electromagnetic signals exceeds one gigahertz.

28. The method of claim 24 wherein the step of modulating comprises rotating polarizations of the entangled photons in proportion to the information.

29. A method of calculating a cross-ambiguity function comprising:
receiving first electromagnetic signals at a first location;
receiving second electromagnetic signals at a second location;
producing pump laser photons;
generating entangled photons from the pump laser photons, the entangled photons comprising a first group and a second group, each photon from the first group being entangled with a photon from the second group;
modulating at least a portion of photons from the first group with first information relating to the first electromagnetic signal to produce first modulated photons;
modulating at least a portion of photons from the second group with second information relating to the second electromagnetic signal to produce second modulated photons;
directing the first modulated photons and the second modulated photons to an optical cavity;
directing the first modulated photons and the second modulated photons from the optical cavity to a coincidence counter to produce a coincidence count;
calculating, using computer hardware, a cross ambiguity function value for the first electromagnetic signals and the second electromagnetic signals based at least in part on the coincidence count; and
outputting a signal representing the cross ambiguity function value.

30. The method of claim 29 wherein the first information comprises a first time parameter, a first frequency parameter, and an intermediate frequency signal corresponding to the first electromagnetic signal.

31. The method of claim 30 wherein:
the second information comprises a second time parameter, a second frequency parameter, and an intermediate frequency corresponding to the second electromagnetic signal; and
the step of calculating comprises calculating a cross ambiguity function value related to the first electromagnetic signals, the second electromagnetic signals, a time derived from the first time parameter and the second time parameter, and a frequency derived from the first frequency parameter and the second frequency parameter.

32. The method of claim 29 wherein the step of calculating comprises calculating a square root and scaling.

33. The method of claim 29 wherein a bandwidth of the first electromagnetic signals and the second electromagnetic signals is on the order of one gigahertz.

34. The method of claim 29 wherein a bandwidth of the first electromagnetic signals and the second electromagnetic signals exceeds one gigahertz.

35. The method of claim 29 wherein the step of modulating at least a portion of photons from the first group comprises rotating photon polarizations in proportion to the first information and the step of modulating at least a portion of photons from the second group comprises rotating photon polarizations in proportion to the second information.

36. A method of calculating a cross-ambiguity function comprising:
receiving electromagnetic signals;
generating entangled photons;

modulating the entangled photons with information relating to signals received by the receiving to produce modulated photons;

detecting absorption of the modulated photons by a biphoton sensitive material and generating detection information therefrom;

calculating, using computer hardware, a cross ambiguity function value relating to the electromagnetic signals based at least in part on the detection information; and outputting a signal representing the cross ambiguity function value.

37. The method of claim 36 wherein the detection information comprises data representing indicia of biphoton absorption at a location along a magnetic field gradient.

38. The method of claim 37 wherein the indicia relates to one or more from the group consisting of: fluorescence, phosphorescence, direct electron transfer, and ionization.

39. The method of claim 36 wherein the detection information comprises a number of biphoton absorptions detected during a specified time period.

40. The method of claim 36 wherein the step of calculating comprises calculating a square root and scaling.

41. The method of claim 36 wherein a bandwidth of the electromagnetic signals is on the order of one gigahertz.

42. The method of claim 36 wherein a bandwidth of the electromagnetic signals exceeds one gigahertz.

43. The method of claim 36 wherein the step of modulating comprises rotating polarizations of the entangled photons in proportion to the information.

44. A method of calculating a cross-ambiguity function comprising:

receiving a first electromagnetic signal at a first location;

receiving a second electromagnetic signal at a second location;

producing pump laser photons;

generating entangled photons from the pump laser photons, the entangled photons comprising a first group and a second group, each photon from the first group being entangled with a photon from the second group;

modulating at least a portion of photons from the first group with first information relating to the first electromagnetic signal to produce first modulated photons;

modulating at least a portion of photons from the second group with second information relating to the second electromagnetic signal to produce second modulated photons;

directing the first modulated photons and the second modulated photons to an optical cavity containing a biphoton sensitive material;

detecting biphoton absorption of the first modulated photons and the second modulated photons by the biphoton sensitive material;

calculating, using computer hardware, a cross ambiguity function value for the first electromagnetic signals and the second electromagnetic signals based at least in part on detection information derived from the step of detecting; and outputting a signal representing the cross ambiguity function value.

45. The method of claim 44 wherein the first information comprises a first time parameter, a first frequency parameter, and an intermediate frequency signal corresponding to the first electromagnetic signal.

46. The method of claim 45 wherein:

the second information comprises a second time parameter, a second frequency parameter, and an intermediate frequency signal corresponding to the second electromagnetic signal; and the step of calculating comprises calculating a cross ambiguity function related to the first electromagnetic signal, the second electromagnetic signal, a time derived from the first time parameter and the second time parameter, and a frequency derived from the first frequency parameter and the second frequency parameter.

47. The method of claim 44 wherein the information relating to the detecting comprises information of a location along a magnetic field gradient.

48. The method of claim 44 wherein the step of detecting comprises detecting indicia relating to one or more from the group consisting of: fluorescence, phosphorescence, direct electron transfer, and ionization.

49. The method of claim 44 wherein the information relating to the step of detecting comprises a number of biphoton absorptions detected during a specified time period.

50. The method of claim 44 wherein the step of calculating comprises calculating a square root and scaling.

51. The method of claim 44 wherein a bandwidth of the first electromagnetic signals and the second electromagnetic signals is on the order of one gigahertz.

52. The method of claim 44 wherein a bandwidth of the first electromagnetic signals and the second electromagnetic signals exceeds one gigahertz.

53. The method of claim 44 wherein the step of modulating at least a portion of photons from the first group comprises rotating photon polarizations in proportion to the first information and the step of modulating at least a portion of photons from the second group comprises rotating photon polarizations in proportion to the second information.

54. A system for calculating a cross-ambiguity function, the system comprising:

means for receiving electromagnetic signals;

means for generating entangled photons;

means for modulating the entangled photons with information relating to received electromagnetic signals to produce modulated photons;

means for detecting the modulated photons; and means for calculating a cross ambiguity function value relating to the received electromagnetic signals based at least in part on information derived from detecting the modulated photons.

55. A system for calculating a cross-ambiguity function, the system comprising:

a source of entangled photons, the entangled photons comprising a first portion and a second portion, each photon in the first portion being entangled with a photon in the second portion;

a first modulator configured to modulate the first portion with first information relating to received first electromagnetic signals to produce first modulated photons;

a second modulator configured to modulate the second portion with second information relating to received second electromagnetic signals to produce second modulated photons;

an entangled photon detector configured to detect entangled photons comprising at least one photon of the first modulated photons and at least one photon of the second modulated photons; and at least one processor configured to receive data from the entangled photon detector and to produce a cross ambiguity function value relating to the first electromagnetic signals and the second electromagnetic signals.

56. The system of claim 55 wherein the entangled photon detector comprises a biphoton sensitive material.

57. The system of claim 56 wherein the data comprises data representing indicia of biphoton absorption at a location along a magnetic field gradient.

58. The system of claim 57 wherein the indicia of biphoton absorption relates to one or more from the group consisting of: fluorescence, phosphorescence, direct electron transfer, and ionization.

59. The system of claim 55 wherein the entangled photon detector comprises an electronic coincidence counter.

60. The system of claim 55 wherein the data relates to a number of biphoton detection events detected during a specified time period.

61. The system of claim 55 wherein the cross ambiguity function value is related to a time offset and a frequency offset.

62. The system of claim 55 configured to receive electromagnetic signals having a bandwidth on the order of one gigahertz.

63. The system of claim 55 configured to receive electromagnetic signals having a bandwidth exceeding one gigahertz.

64. The system of claim 55 wherein the first and second modulators are configured to rotate polarizations of photons.

65. A system for calculating a cross-ambiguity function, the system comprising:
a pump laser configured to produce pump laser photons;
an entangled photon generator configured to generate entangled photons comprising signal photons and idler photons from the pump laser photons;
a first modulator configured to modulate the signal photons with first information relating to a received first electromagnetic signal to produce first modulated photons;
a second modulator configured to modulate the idler photons with second information relating to a received second electromagnetic signal to produce second modulated photons;
an optical cavity configured to receive the first modulated photons and the second modulated photons;
a detector configured to detect the first modulated photons and the second modulated photons; and
at least one processor configured to receive data from the detector and calculate a cross ambiguity function value relating to the first electromagnetic signals and the second electromagnetic signals.

66. The system of claim 65 wherein the first information comprises one or more of a first time parameter, a first frequency parameter, and an intermediate frequency signal corresponding to the first electromagnetic signal.

67. The system of claim 66 wherein the second information comprises one or more of a second time parameter, a second frequency parameter, and an intermediate frequency signal corresponding to the second electromagnetic signal.

68. The system of claim 65 wherein the detector comprises a biphoton sensitive material.

69. The system of claim 68 further comprising a magnetic field gradient present in the biphoton sensitive material.

70. The system of claim 65 wherein the detector is configured to detect indicia related to one or more from the group consisting of: fluorescence, phosphorescence, direct electron transfer, and ionization.

71. The system of claim 65 wherein the detector comprises an electronic coincidence counter.

72. The system of claim 65 wherein the data relates to a number of detection events during a specified time period.

73. The system of claim 65 wherein the at least one processor is configured to calculate a square root and scale.

74. The system of claim 65 configured to receive electromagnetic signals having a bandwidth on the order of one gigahertz.

75. The system of claim 65 configured to receive electromagnetic signals having a bandwidth exceeding one gigahertz.

76. The system of claim 65 wherein the first and second modulators are configured to rotate polarizations of the signal photons in proportion to the first information and rotate polarizations of the idler photons in proportion to the second information.

* * * * *